United States Patent [19]

Okumura

[11] Patent Number: 5,314,745
[45] Date of Patent: May 24, 1994

[54] MAGNETIC RECORDING MEDIUM HAVING A GLASS SUBSTRATE, HEAT RETAINING NON MAGNETIC METAL LAYER FORMED OVER THE SUBSTRATE, AMORPHOUS NIP LAYER, CR LAYER AND MAGNETIC LAYER

[75] Inventor: Yoshinobu Okumura, Amagasaki, Japan

[73] Assignee: Kubota Corporation, Osaka, Japan

[21] Appl. No.: 931,366

[22] Filed: Aug. 18, 1992

[30] Foreign Application Priority Data

Jan. 17, 1992 [JP] Japan .................................. 4-006791

[51] Int. Cl.⁵ ............................................. G11B 5/00
[52] U.S. Cl. .................................... 428/336; 428/433; 428/660; 428/666; 428/667; 428/680; 428/694 TS; 428/694 ST; 428/694 TP; 428/611; 428/900; 428/928
[58] Field of Search ............... 428/336, 433, 660, 666, 428/667, 680, 694, 695, 900, 611, 928, 694 TS, 694 ST, 694 TP

[56] References Cited

U.S. PATENT DOCUMENTS 4,794,047 12/1988 Funamoto ........................ 428/408
4,990,362 2/1991 Kibe et al. ........................... 427/38
5,037,515 8/1991 Tsai et al. ...................... 204/192.15
5,084,152 1/1992 Lin ................................ 204/192.15

FOREIGN PATENT DOCUMENTS 02029923 1/1990 Japan .
02246017 10/1990 Japan .

Primary Examiner—Stevan A. Resan
Attorney, Agent, or Firm—Armstrong, Westerman, Hattori, McLeland & Naughton

[57] ABSTRACT

A magnetic recording medium comprising a substrate, a ground layer formed over at least one surface of the substrate, and a magnetic layer formed over the ground layer, the ground layer being formed of a material containing at least 95% by weight of Cr. The substrate comprises a base of glass plate, a nonmagnetic metal layer formed over at least one surface of the base, and an amorphous NiP layer formed over the nonmagnetic metal layer. The nonmagnetic metal layer is formed of a material containing at least 95% by weight of Cr, or a material containing at least 95% by weight of Ti or a material containing at least 95% by weight of Cr-Ti alloy. The recording medium has excellent flatness and a high coercive force.

6 Claims, 2 Drawing Sheets

MAGNETIC RECORDING MEDIUM HAVING A GLASS SUBSTRATE, HEAT RETAINING NON MAGNETIC METAL LAYER FORMED OVER THE SUBSTRATE, AMORPHOUS NIP LAYER, CR LAYER AND MAGNETIC LAYER

FIELD OF THE INVENTION

The present invention relates to magnetic recording media, and more particularly to magnetic recording media for use in magnetic disc devices and the like.

In recent years, a rapid advance has been made in recording data on magnetic recording media with a higher density. Magnetic recording media of the thin metal film type are in wide use which comprise a magnetic layer of CoNiCr, CoCrTa or like Co alloy having a uniaxial crystal magnetic anisotropy.

With reference to FIG. 3, the magnetic recording medium of the thin metal film type comprises a nonmagnetic substrate 10, a ground layer 20 of Cr formed over each surface of the substrate, and a magnetic layer 22 of Co alloy or the like formed over the ground layer. A protective layer 24 in the form of a carbon film is usually formed over the magnetic layer.

As shown in FIG. 4, the nonmagnetic substrate 10 comprises a base 12 of Al alloy plate, and an amorphous NiP layer 16 formed over each surface of the base by plating. The NiP layer is hard, therefore imparts rigidity to the Al alloy base, and further acts to uniformly orient the crystals of the ground Cr layer to facilitate longitudinal orientation of the magnetic layer, consequently improving the magnetic layer in its coercive force.

To increase the density of recording on magnetic recording media, the distance between the magnetic head and the medium needs to be decreased to the greatest possible extent. It is therefore generally desirable that the amount of rise of the head off the medium be not greater than about 0.05 μm.

However, since the Al alloy base is made of a soft material and is susceptible to plastic deformation, it is difficult to give the desired rigidity to the base despite the provision of the NiP layer. Accordingly, the substrate is poor in flatness, making it impossible to reduce the amount of rise of the head to not greater than about 0.05 μm. Thus, we have found that the Al alloy base is unsuitable for use in realizing recording with a higher density.

To improve the flatness of the substrate and thereby reduce the amount or rise of the head, a glass plate having high rigidity is proposed for use as the base 12 as seen in FIG. 5.

For the Cr ground layer to exhibit the desired crystal orientation, the ground layer must be formed, with the NiP layer heated to a temperature of at least about 250° C. On the other hand, if the NiP layer is crystallized by heating, the crystals of the ground layer become oriented randomly under the influence of the crystal structure of the NiP layer to impair the coercive force of the magnetic layer. Since the NiP layer crystallizes at a temperature of about 310° to 320° C., the NiP layer needs to be heated at a temperature of up to about 300° C., with an allowance considered.

The NiP layer is heated usually by an infrared heater in view of productivity, etc. When the base is made of Al alloy conventionally used, the Al alloy effectively absorbs infrared electromagnetic waves, permitting the overall substrate to be readily heated to the desired temperature, whereas use of the glass plate encounters a new problem. The glass plate predominantly reflects infrared electromagnetic waves and will not be heated greatly, permitting the NiP layer only to be markedly heated to a temperature in excess of 310° to 320° C. to result in the crystallization of the NiP layer.

Although resistance heaters and like heating means other than the infrared heater are usable, these heating means require a longer period of time for heating the substrate and are not suited to industrial production.

SUMMARY OF THE INVENTION

The main object of the present invention is to provide a magnetic recording medium which has satisfactory flatness and a high coercive force and wherein a ground layer is formed over a substrate comprising a glass plate base and an NiP layer after heating the NiP layer to a temperature of about 250° to about 300° C. with an infrared heater while maintaining the NiP layer substantially in this temperature condition.

The magnetic recording medium of the present invention comprises a substrate, a ground layer formed over at least one surface of the substrate, and a magnetic layer formed over the ground layer, the ground layer being formed of a material containing at least 95% (wt. %, the same as hereinafter) of Cr, the substrate comprising a base of glass plate, a nonmagnetic metal layer formed over at least one surface of the base, and an amorphous NiP layer formed over the nonmagnetic metal layer, the nonmagnetic metal layer being formed of a material containing at least 95% of Cr, or a material containing at least 95% of Ti or a material containing at least 95% of Cr-Ti.

DETAILED DESCRIPTION OF THE INVENTION

Figure 1:
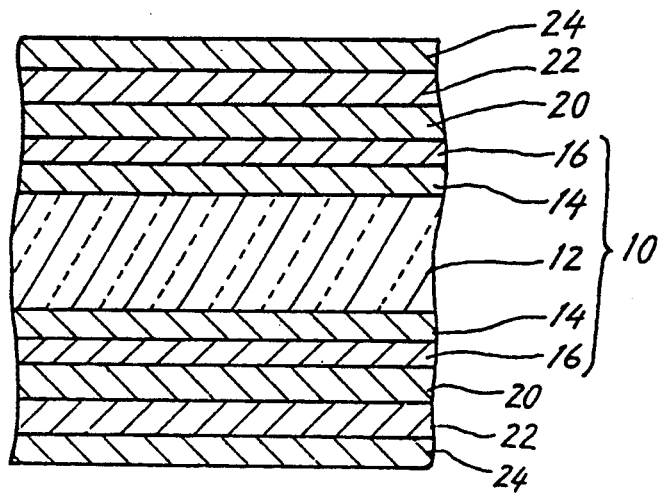
FIG. 1 is a sectional view of a magnetic recording medium embodying the invention.

FIG. 1 is a fragmentary sectional view of a magnetic recording medium embodying the invention. The magnetic recording medium of the invention comprises a ground layer 20, a magnetic layer 22 and a protective layer 24 which are formed over a substrate 10 and which are arranged one over another in the order mentioned. With the present embodiment, the ground layer, magnetic layer and protective layer are formed over each surface of the substrate symmetrically with respect to the substrate so that data can be magnetically recorded on each side of the medium. However, these layers may be formed over only one surface of the substrate to use only one side of the medium for magnetic recording.

The substrate 10 comprises a nonmagnetic metal layer 14 formed over each surface of a base 12 of glass plate, and an NiP layer 16 formed over the nonmagnetic metal layer.

The nonmagnetic metal layer 14 over the glass plate base 12 is formed of a material containing at least 95% of Cr, or a material containing at least 95% of Ti or a material containing at least 95% of Cr-Ti These materials are useful because they have excellent heat conductivity, exhibiting high heat retentivity when formed into a layer over the glass plate. The expression "at least 95%" used for each material means that the material is substantially Cr or Ti or Cr-Ti alloy. The material may contain about 5% of an element (such as Si, B or V) added thereto and usually used.

In the case where the base used is about 31.5 mils in thickness, the thickness of the nonmagnetic metal layer 14 is preferably at least about 300 angstroms, because if the thickness is less than about 300 angstroms, the quantity of heat retainable is smaller, presenting difficulty in maintaining the NiP layer at a temperature of at least about 250° C. for the formation of the ground layer. On the other hand, too large a thickness produces more pronounced surface irregularities on the layer to result in impaired planarity. For this reason, the thickness is preferably up to about 2500 angstroms.

The thickness of the nonmagnetic metal layer is of course suitably variable with the thickness of the base used.

The amorphous NiP layer 16 is formed usually to a thickness of about 250 to about 1000 angstroms. The NiP layer has a relatively larger thickness when it is to be formed by plating instead of sputtering.

When required, the surface of the NiP layer can be formed with a texture. The texture is provided by circumferential indentations or projections and can be mechanically formed with a lapping tape or loose abrasive grains. The texture acts to orient the crystal axis of Co alloy forming the magnetic layer in the circumferential direction and is effective for giving an enhanced coercive force. When textured, on the other hand, the NiP layer exhibits impaired surface planarity, necessitating a slightly increased amount of rise of the head. Whether the surface of the NiP layer is to be textured or not is to be determined suitably in accordance with the need therefor.

The ground layer 20 is formed by a material which is substantially Cr. Insofar as the material contains at least about 95% of Cr, the balance may be an element or elements which are added thereto as usual. The magnetic layer of Co alloy having hcp crystal structure and exhibiting uniaxial crystal magnetic anisotropy is formed over the ground layer. The ground layer is formed over the amorphous NiP layer in the manner previously mentioned, whereby the crystals of the ground layer are so oriented as to facilitate longitudinal orientation of the magnetically anisotropic crystal axis (C axis) of the magnetic layer. The ground layer is preferably about 500 to about 2000 angstroms in thickness.

Preferably, the magnetic layer 22 is formed by a Co alloy having uniaxial crystal magnetic anisotropy, such as CoNiCr, CoCrTa or CoCrPt, as previously stated. The magnetic layer is not limited to a single layer of Co alloy but may comprise Co alloy layers and Cr layers as arranged alternately in superposed layers. The thickness of the magnetic layer 22 (thickness of the single Co alloy layer or combined thickness of the component superposed layers) is preferably about 400 to about 800 angstroms because Brδ of about 300 to about 500 G.μ is required of the magnetic recording medium to ensure a reproduction output and reduction of noise.

The protective layer 24 is made of carbon material or the like and preferably has a thickness of about 150 to about 400 angstroms. The protective layer 24 may be coated with fluorinated polyether or like lubricant to a thickness of about 10 to about 50 angstroms. The protective layer and the lubricant coating layer may be formed as required.

The substrate 10 is obtained usually by forming the nonmagnetic metal layer 14 and the NiP layer 16 over the glass plate base 12 by sputtering. Alternatively, these layers may be formed by plating.

As already described, the ground layer 20 and the magnetic layer 22 are formed over the substrate 10 generally by sputtering after the surface of the NiP layer 16 is heated to a temperature of about 250° to about 300° C. with an infrared heater. Instead of sputtering, other physical vapor deposition processes can be resorted to.

EXAMPLE 1

Tested in this example were magnetic recording media each prepared using a substrate (i) comprising a nonmagnetic metal layer, and magnetic recording media each prepared using a substrate (ii) having no non-magnetic metal layer. The Cr ground layers of these media were formed under varying heating conditions, and the media were checked for the coercive force of the magnetic layer.

More specifically, substrates (i) were prepared by forming a nonmagnetic Cr layer having a thickness of 700 angstroms over a crystallized glass plate and forming an NiP (Ni-12 wt. % P) layer having a thickness of 700 angstroms over the Cr layer, using a D.C. magnetron sputtering device. Substrates (ii) were prepared by forming an NiP layer having a thickness of 700 angstroms directly over a crystallized glass plate.

Figure 2:
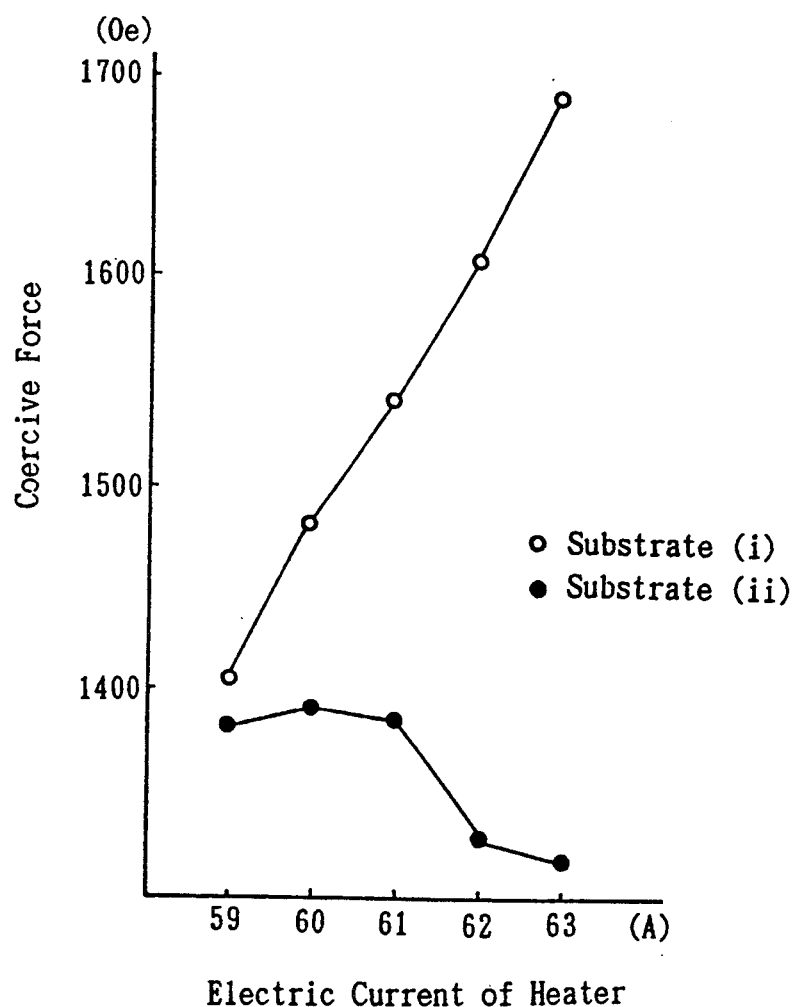
FIG. 2 is a graph showing the result obtained by checking the influence on the coercive force of a magnetic layer produced by the presence or absence of a nonmagnetic metal layer at varying heater current values.
Figure 3:
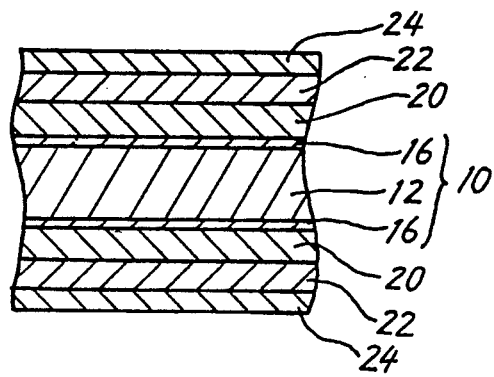
FIG. 3 is a sectional view showing a conventional magnetic recording medium.
Figure 4:
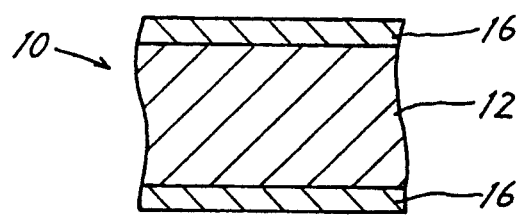
FIGS. 4 and 5 are sectional views showing the substrates of conventional magnetic recording media.
Figure 5:
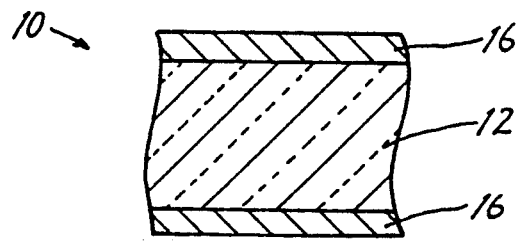

The surface of each of these substrates was heated with an infrared heater and subsequently formed with a Cr ground layer having a thickness of 1200 angstroms and then with a magnetic layer of Co-12Cr-2Ta having a thickness of 600 angstroms. For forming the Cr ground layer and the magnetic layer, a negative bias voltage (−300 V) was applied to the substrate. The substrates were heated for a predetermined period of time (12 seconds) at varying current values of 50 A to 63 A. FIG. 2 shows the test result.

FIG. 2 reveals that with the media including the substrate (ii) with no nonmagnetic metal layer, the magnetic layers were about 1380 to 1390 Oe in coercive force at varying current values of 59 A to 61 A. This appears attributable to the failure of the NiP layer to reach the specified temperature, such that the crystals of the ground Cr layer over the NiP layer were not oriented suitably for causing longitudinal orientation of the magnetic layer. At 62 A and 63 A, the magnetic layer exhibited a reduced coercive force of about 1320 Oe because the increase in the current value caused the NiP layer only to temporarily reach the crystallization temperature and to become crystallized, with the result that the ground Cr layer was randomly oriented under the influence of the crystal structure of the NiP layer to similarly orient the magnetic layer randomly, hence the reduced coercive force.

With the magnetic recording media having the substrate (i), the coercive force was low, i.e., about 1510 Oe, at 59 A but increased to about 1570 Oe at 60 A. The coercive force increased with a further increase in the current value. This result indicates that although the substrate was heated insufficiently at 59 A, passage of current of at least 60 A caused the NiP layer to uniformly orient the crystals of the ground Cr layer, consequently giving an enhanced coercive force to the magnetic layer (when the heating time was 12 seconds). Thus, the coercive force of the magnetic layer can be improved remarkably by suitably setting the heating condition.

EXAMPLE 2

Next, substrates were prepared using different materials for forming nonmagnetic metal layers having varying thicknesses, and forming NiP layers of varying thicknesses to obtain magnetic recording media, which were checked for coercive force for comparison. Table 1 shows the construction of these substrate samples.

The surface of NiP layer of each substrate was textured circumferentially thereof. The Cr ground layer, magnetic layer and carbon protective layer formed over the substrate as superposed thereon were 1200 angstroms, 650 angstroms and 250 angstroms, respectively, in thickness. All the substrates were heated by an infrared heater under the same condition, i.e., with a current of 63 A for 12.5 seconds, for forming their Cr ground layers. The Co alloy used for the magnetic layers was $Co_{86}Cr_{12}Ta_2$ as expressed in atomic %.

Table 1 also shows the coercive force of the magnetic recording media measured.

TABLE 1

| Sample No. | Substrate | | Nip layer Thickness (Å) | Coercive force of magnetic layer (Oe) |
|---|---|---|---|---|
| | Nonmagnetic metal layer | | | |
| | Material | Thickness (Å) | | |
| 1 | Cr | 500 | 300 | 1630 |
| 2 | Cr | 700 | 300 | 1710 |
| 3 | Cr | 900 | 250 | 1720 |
| 4 | Ti | 700 | 300 | 1590 |
| 5 | Ti | 900 | 300 | 1600 |
| 6 | Cr—Ti | 320 | 300 | 1520 |
| 10 | — | — | 300 | 1350 |
| 11 | Cr | 270 | 300 | 1370 |

With reference to Table 1, samples No. 1 to No. 6 are examples of the invention. Sample No. 10 is a comparative example wherein the substrate has no nonmagnetic metal layer. Sample No. 11 is another comparative example wherein the nonmagnetic metal layer is thin.

The magnetic recording media of samples No. 1 to No. 6 according to the invention are all excellent in coercive force. A comparison between samples No. 2 and No. 4 indicates that No. 2 is higher in coercive force. Accordingly, even Ti used for forming the nonmagnetic metal layer is effective for giving a fully improved coercive force, but Cr is more preferable to use.

In the case of the magnetic recording medium of sample No. 10 wherein the substrate has no non-magnetic metal layer, the NiP layer becomes almost crystallized, permitting the crystals of both the ground Cr layer and the magnetic layer to become oriented randomly to result in a low coercive force even when the same heating condition as used for the samples No. 1 to No. 6 is employed. With the medium of sample No. 11, the nonmagnetic metal layer is thin and therefore fails to retain a sufficient quantity of heat, allowing the NiP layer to partly crystallize to result in a low coercive force. Incidentally, the optimum thickness of the nonmagnetic metal layer somewhat differs with the mass effect of the substrate.

As already described, the substrate of the magnetic recording medium of the invention is excellent in flatness because a glass plate is used as the base, whereby the amount of rise of the head can be reduced to not greater than about 0.05 μm. Furthermore, the specified nonmagnetic metal layer formed over the glass plate suppresses a rapid rise in the temperature of the NiP layer when the substrate is heated with an infrared heater before the ground Cr layer is formed, also preventing the temperature of the NiP layer from dropping after the heating. Accordingly, the ground layer can be formed with the NiP layer maintained at a temperature of about 250° to 300° C., with the result that the crystals of the ground layer can be so oriented as to facilitate longitudinal orientation of the magnetic layer.

What is claimed is:

1. A magnetic recording medium comprising a substrate, a ground layer being made of a material containing at least 95% by weight of Cr and formed over one surface of the substrate, and a magnetic layer formed over the ground layer; said substrate comprising:

a base of glass plate;

a nomagnetic metal layer formed over the ground layer; said substrate comprising:

a base of glass plate;

a nonmagnetic metal layer formed over the glass base and having a thickness sufficient for retention of heat wherein the substrate is heated by infrared electromagnetic waves for forming the ground layer; and an amorphous NiP layer formed over the nonmagnetic metal layer and having a thickness of about 250 to 1000 angstroms.

2. A magnetic recording medium as defined in claim 1 wherein the ground layer is formed over each of opposite surfaces of the substrate, the magnetic layer being formed over the ground layer, and the non-magnetic metal layer is formed over ech of opposite surfaces of the base of the substrate, the amorphous NiP layer being formed over the nonmangetic metal layer.

3. A magnetic recording medium as defined in claim 1 wherein the nonmagnetic metal layer is at least about 300 angstroms in thickness.

4. A magnetic recording medium as defined in claim 1 wherein a protective layer is formed over the magnetic layer.

5. A magnetic recording medium as defined in claim 4 wherein the protective layer is coated with a lubricant.

6. A magnetic recording medium as defined in claim 1, wherein said nonmagnetic metal layer is made of a material selected from the group consisting of a material containing at least 95% by weight of Cr, a material containing at least 95% by weight of Ti or a material containing Cr and Ti having a combined amount of at least 95% by weight.

* * * * *